(12) United States Patent
Quinto

(10) Patent No.: US 9,839,889 B2
(45) Date of Patent: *Dec. 12, 2017

(54) MIXER GUN SYSTEM AND METHOD

(71) Applicant: Kyphon SÀRL, Neuchâtel (CH)

(72) Inventor: Mark Quinto, San Jose, CA (US)

(73) Assignee: Kyphon SÀRL, Neuchâtel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,177

(22) Filed: May 19, 2016

(65) Prior Publication Data

US 2016/0256838 A1 Sep. 8, 2016

Related U.S. Application Data

(63) Continuation of application No. 13/445,988, filed on Apr. 13, 2012, now Pat. No. 9,358,715.

(51) Int. Cl.
| | |
|---|---|
| *B01F 13/00* | (2006.01) |
| *B29B 7/22* | (2006.01) |
| *B29C 47/12* | (2006.01) |
| *B29C 47/00* | (2006.01) |
| *B01F 11/00* | (2006.01) |
| *B01F 15/02* | (2006.01) |

(52) U.S. Cl.
CPC ...... *B01F 13/0027* (2013.01); *B01F 11/0071* (2013.01); *B01F 15/0206* (2013.01); *B01F 15/0234* (2013.01); *B01F 15/0237* (2013.01); *B01F 15/0279* (2013.01); *B29B 7/22* (2013.01); *B29C 47/0002* (2013.01); *B29C 47/12* (2013.01); *B01F 2215/0029* (2013.01)

(58) Field of Classification Search
CPC .............................. B01F 13/0027; B29C 47/12
USPC ......................................... 366/130, 139, 189
See application file for complete search history.

(56) References Cited

U.S. PATENT DOCUMENTS

| | | | |
|---|---|---|---|
| 5,104,005 A * | 4/1992 | Schneider, Jr. ... | B05C 17/00553 222/137 |
| 5,137,181 A * | 8/1992 | Keller ............... | B05C 17/00553 222/134 |
| 5,314,092 A * | 5/1994 | Jacobsen .......... | B05C 17/00513 222/137 |
| 5,443,182 A | 8/1995 | Tanaka et al. | |
| 5,514,135 A | 5/1996 | Earle | |
| 6,042,262 A | 3/2000 | Hajianpour | |
| 6,079,868 A | 6/2000 | Rydell | |

(Continued)

*Primary Examiner* — Abbas Rashid

(57) ABSTRACT

A mixer gun system includes a holder cap configured to separately store components in separate chambers. The components are selectively releasable through channels fluidly communicating with the separate chambers. The components are constituent materials for a bone cement mixture. A body forms a mixing chamber and is configured to receive the holder cap. The mixing chamber includes an opening corresponding with the channels for the separate chambers. A piston is disposed within the mixing chamber. A plunger is coupled to the piston and is configured to be biased toward the mixing chamber such that when the components are released into the mixing chamber a pressure developed by a biased motion of the plunger and piston infuses the components to form bone cement. Upon resetting the plunger and the piston, the bone cement is dispensed from the mixing chamber by the same biased motion. Methods of use are disclosed.

15 Claims, 2 Drawing Sheets

(56) References Cited

U.S. PATENT DOCUMENTS

| | | | |
|---|---|---|---|
| 6,116,773 | A | 9/2000 | Murray |
| 6,296,149 | B1 | 10/2001 | Long |
| 6,302,574 | B1 | 10/2001 | Chan |
| 6,382,466 | B1 * | 5/2002 | Schneider ......... B05C 17/00553 222/137 |
| 6,520,381 | B1 | 2/2003 | Prestele |
| 6,592,247 | B1 | 7/2003 | Brown et al. |
| 7,841,763 | B2 | 11/2010 | Foster |
| 8,377,507 | B2 | 2/2013 | Wawrzyniak et al. |
| 2003/0021180 | A1 | 1/2003 | Wahlig et al. |
| 2008/0144426 | A1 | 6/2008 | Janssen et al. |
| 2009/0281549 | A1 | 11/2009 | Dixon |

* cited by examiner

MIXER GUN SYSTEM AND METHOD

CROSS-REFERENCE TO RELATED APPLICATIONS

This application is a Continuation of U.S. patent application Ser. No. 13/445,988, filed on Apr. 13, 2012, which is incorporated herein by reference herein, in its entirety.

TECHNICAL FIELD

The present disclosure generally relates to medical devices for bone repair, and more particularly to a medical system and method for mixing and dispensing bone cement or other materials.

BACKGROUND

Many medical procedures employ medical grade cement in connection with the restoration and strengthening of bone structures. During such procedures, cement is typically dispensed to a bone to fill in voids or spaces in the bone or between medical devices or implants attached to or embedded within the bone. These dispensing devices may include systems as simple as syringes and as complex as electronically controlled valves.

Due to the medical nature of some procedures, the amount and placement of the fluids, such as, cement, need to be supervised carefully. Despite the simplicity or complexity of the dispensing system, control over when, where and how much cement is dispensed is of concern. Currently, there is a need for an easier bone cement mixer and dispensing tool that would permit for fewer steps or less complicated steps in a mixing and dispensing process. This disclosure describes improvements over these prior art technologies in providing improved systems for dispensing fluids.

SUMMARY

Accordingly, a mixer gun system and method for mixing/infusing bone cement components are provided. In one embodiment, in accordance with the principles of the present disclosure, a mixer gun system is provided. The system comprises a removable holder cap configured to separately store two or more components in separate chambers formed therein. The components are selectively releasable through channels fluidly communicating with the separate chambers. The components are constituent materials for bone cement. A body forms a mixing chamber therein and is configured to receive the holder cap. The mixing chamber includes an opening corresponding with the channels for the separate chambers. A piston is disposed within the mixing chamber. A plunger is coupled to the piston and is configured to be biased toward the mixing chamber such that when the components are released into the mixing chamber from the holder cap a pressure developed by a biased motion of the plunger and piston infuses the components to form the bone cement and, upon resetting the plunger and the piston, the bone cement is dispensed from the mixing chamber by the same biased motion.

In one embodiment, the system comprises a removable holder cap configured to separately store two components in separate chambers formed therein. The two components are selectively releasable through channels fluidly communicating with the separate chambers. The two components are constituent materials for bone cement. The separate chambers are configured to receive a first component of the bone cement and a second component of the bone cement, wherein the first component includes a powder disposed in a tray and the second component includes a monomer disposed in a vial. A break device is mounted on the holder cap. The break device includes one or more tools configured to puncture or cut a surface of component containers during installation of the holder cap to concurrently release the first component and the second component from the separate chambers. A body forms a mixing chamber therein and is configured to receive the holder cap. The mixing chamber includes at least one opening corresponding with the channels for the separate chambers, and the body includes a handle. A trigger is pivotally coupled to the handle. A rotating end cap is rotatably connected to the holder cap and is configured to provide fluid communication between the separate chambers and the mixing chamber in a first position and prevent fluid communication between the separate chambers and the mixing chamber in a second position. A piston is disposed within the mixing chamber. A plunger includes a shaft with a threaded portion, the plunger being coupled to the piston and configured to be biased toward the mixing chamber with a spring. A switch is pivotally coupled to the body and engages the trigger wherein the switch also engages the threaded portion to prevent the biased motion of the plunger. The trigger activates the switch to release the plunger to provide a biased motion such that when the two or more components are released into the mixing chamber from the holder cap, a pressure developed by the biased motion of the plunger and piston infuses the two components to form the bone cement. Upon resetting the plunger and the piston, the bone cement is dispensed from the mixing chamber by the same biased motion.

In one embodiment, a method for delivering bone cement includes providing a mixer gun system having a removable holder cap configured to separately store two or more components in separate chambers formed therein, the two or more components being selectively releasable through channels fluidly communicating with the separate chambers, the two or more components being constituent materials for bone cement, a body forming a mixing chamber therein and configured to receive the holder cap, the mixing chamber including at least one opening corresponding with the channels for the separate chambers, a piston disposed within the mixing chamber, and a plunger is coupled to the piston and configured to be biased toward the mixing chamber; infusing the two or more components by releasing the two or components into the mixing chamber from the separate chambers and a developing pressure by a biased motion of the plunger and piston to form a bone cement; resetting the plunger and the piston to prepare for dispensing the bone cement; and dispensing the bone cement from the mixing chamber by the same biased motion.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
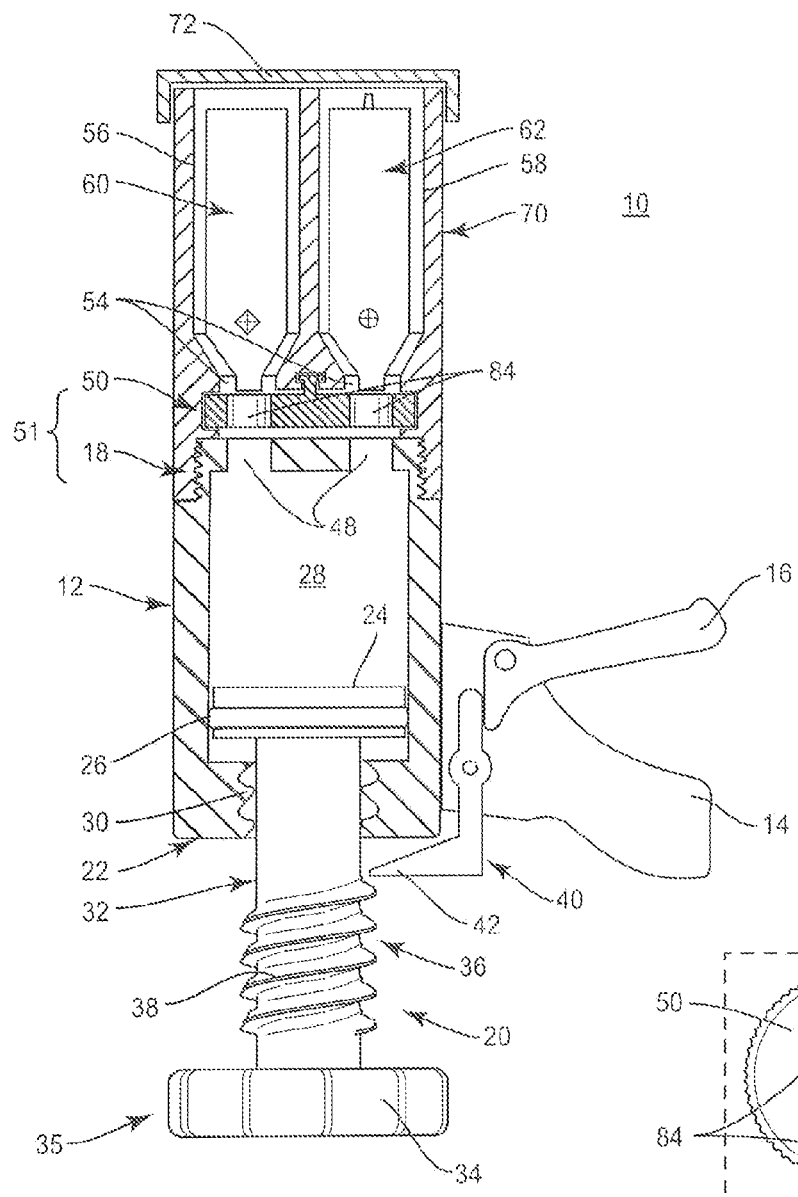
FIG. 1 is a side view in partial cross-section of one embodiment of components of a mixer gun system in accordance with the present principles.

The exemplary embodiments of a mixer gun and related methods are discussed in terms of medical devices for the treatment of skeletal injuries, disorders and repairs and more particularly, in terms of a mixing and dispensing gun and method for bone repair. It is envisioned that the system and method may be employed in applications such as correction of cracks, fissures, voids, e.g., due to osteoporosis or other diseases or injuries. In addition, the system and method may be employed with the placement of support structures or devices attached to or embedded within bone. For example, such structures may include pins, screws, replacement joints (e.g., of the hip, knee, shoulder), etc.

In one embodiment, a mixer gun creates a loading mechanism for mixing substances, e.g., a powder and a monomer, an epoxy and a catalyst, etc. and provides easy introduction into a mixing chamber. The mixing chamber is employed to provide pressure to infuse one material into the other, e.g., infuse the monomer into the powder. A driving force of the mechanism includes a high force spring that can be controlled with a trigger, although other biasing mechanisms may be employed. In a particularly useful embodiment, a holder cap is employed to receive two or more containers, which hold the materials to be mixed. The holder cap is removably installed on the mixing gun and fluidly communicates with the mixing chamber on a selective basis. The two or more containers are breached to permit their contents to enter the mixing chamber. A trigger is activated to release a plunger, which pressurizes and mixes the contents of the two or more containers.

After the infusion/mixing, the plunger is reset. The holder cap is removed and replaced with a dispensing nozzle. The trigger can now be employed to dispense the mixed material from the mixing chamber through the dispensing nozzle. In one embodiment, the material being dispensed includes bone cement. The bone cement may be introduced internally or externally to a repair site in a patient during a procedure.

It is contemplated that one or all of the components of the surgical system may be disposable, peel-pack, pre-packed sterile devices. One or all of the components of the surgical system may be reusable. The surgical system may be configured as a kit with multiple sized and configured components.

It is envisioned that the present disclosure may be employed to treat or repair bone injuries or disorders such as, for example, osteoporosis, joint replacement, fracture repairs, bone breaks, etc. It is contemplated that the present disclosure may be employed with other osteal and bone related applications, including those associated with diagnostics and therapeutics, such as the delivery of a therapeutic agents to a site for treatment or the delivery of radio opaque markers for tracking fluid once it is released into a patient. It is further contemplated that the disclosed surgical system and methods may be alternatively employed in a surgical treatment with a patient in a prone or supine position, and/or employ various surgical approaches, including anterior, posterior, posterior mid-line, direct lateral, postero-lateral, antero-lateral approaches, etc. in any body region. The system and methods of the present disclosure may also be used on animals, bone models and other non-living substrates, such as, for example, in training, testing and demonstration.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

Further, as used in the specification and including the appended claims, "treating" or "treatment" of a disease or condition refers to performing a procedure that may include administering one or more drugs to a patient (human, normal or otherwise or other mammal), in an effort to alleviate signs or symptoms of the disease or condition. Alleviation can occur prior to signs or symptoms of the disease or condition appearing, as well as after their appearance. Thus, treating or treatment includes preventing or prevention of disease or undesirable condition (e.g., preventing the disease from occurring in a patient, who may be predisposed to the disease but has not yet been diagnosed as having it). In addition, treating or treatment does not require complete alleviation of signs or symptoms, does not require a cure, and specifically includes procedures that have only a marginal effect on the patient. Treatment can include inhibiting the disease, e.g., arresting its development, or relieving the disease, e.g., causing regression of the disease. For example, treatment can include reducing acute or chronic inflammation; alleviating pain and mitigating and inducing re-growth of new ligament, bone and other tissues; as an adjunct in surgery; and/or any repair procedure. Also, as used in the specification and including the appended claims, the term "tissue" includes soft tissue, ligaments, tendons, cartilage and/or bone unless specifically referred to otherwise.

The following discussion includes a description of a mixer gun system and related methods of employing the system in accordance with the principles of the present disclosure. Alternate embodiments are also disclosed. Reference will now be made in detail to the exemplary embodiments of the present disclosure, which are illustrated in the accompanying figures. Turning now to FIGS. 1-6, there are illustrated components of a surgical system, such as, for example, a mixer gun system 10 in accordance with the principles of the present disclosure.

The components of system 10 can be fabricated from biologically acceptable materials suitable for medical applications, including metals, synthetic polymers, ceramics and bone material and/or their composites, depending on the particular application and/or preference of a medical practitioner. For example, the components of system 10, individually or collectively, can be fabricated from materials such as stainless steel alloys, commercially pure titanium, titanium alloys, Grade 5 titanium, super-elastic titanium alloys, cobalt-chrome alloys, stainless steel alloys, super-elastic metallic alloys (e.g., Nitinol, super elasto-plastic metals, such as GUM METAL® manufactured by Toyota Material Incorporated of Japan), ceramics and composites thereof such as calcium phosphate (e.g., SKELITE™ manufactured by Biologix Inc.), thermoplastics such as polyaryletherketone (PAEK) including polyetheretherketone (PEEK), polyetherketoneketone (PEKK) and polyetherketone (PEK), carbon-PEEK composites, PEEK-BaSO$_4$ polymeric rubbers, polyethylene terephthalate (PET), fabric, silicone, polyurethane, silicone-polyurethane copolymers, polymeric rubbers, polyolefin rubbers, hydrogels, semi-rigid and rigid materials, elastomers, rubbers, thermoplastic elastomers, thermoset elastomers, elastomeric composites, rigid polymers including polyphenylene, polyamide, polyimide, polyetherimide, polyethylene, epoxy, bone material including autograft, allograft, xenograft or transgenic cortical and/or corticocancellous bone, and tissue growth or differentiation factors, partially resorbable materials, such as, for example, composites of metals and calcium-based ceramics, composites of PEEK and calcium based ceramics, composites of PEEK with resorbable polymers, totally resorbable materials, such as, for example, calcium based ceramics such as calcium phosphate, tri-calcium phosphate (TCP), hydroxyapatite (HA)-TCP, calcium sulfate, or other resorbable polymers such as polyaetide, polyglycolide, polytyrosine carbonate, polycaroplaetohe and their combinations. Various components of system 10 may have material composites, including the above materials, to achieve various desired characteristics such as strength, rigidity, elasticity, compliance, biomechanical performance, durability and radiolucency or imaging preference. The components of system 10, individually or collectively, may also be fabricated from a heterogeneous material such as a combination of two or more of the above-described materials. The components of system 10 may be monolithically formed, integrally connected or include fastening elements and/or instruments, as described herein.

System 10 is employed, for example, with an open, mini-open or minimally invasive surgical technique to fill voids, provide patches, attach prosthetic devices, etc., or any other bone related repairs.

Referring to FIG. 1, a partial cross-sectional view of the mixer gun system 10 is illustratively shown in accordance with one embodiment. System 10 includes a body 12, which forms and encloses a mixing chamber 12. The body 12 includes a handle 14, which extends from the body 12 and provides a support position for depressing a trigger 16. The handle 14 and the body 12 may be integrally formed or may be separate parts functionally attached to one another. The trigger 16 is pivotally connected to the handle 14 and is biased forward by a biasing device, such as, e.g., a spring or elastic band (not shown). The body 12 includes a threaded exterior distal end portion 18, which is configured to threadedly receive one or more accessories for the system 10. Other connection configurations are also contemplated, e.g., a bayonet connection system, a snap-fit connection system, etc. The body 12 is further configured to receive a plunger 20 through a proximal end portion 22.

The plunger 20 is coupled to a piston head 24 or may be integrally formed therewith. The piston head 24 may include a seal 26 about its periphery, which engages a wall of a mixing chamber 28, which is an interior cavity, formed by the body 12. The seal may include a gasket, an O-ring or the like. The plunger 20 is biased by a biasing device 30, which may include a spring, a deformable elastic material, etc. The biasing device 30 may be seated against the proximal end of the body 12. The plunger 20 includes a shaft 32 having a knob, rear handle or base 34 formed or mounted on a proximal end 35 thereof. The knob 34 is provided for ease of turning the plunger 20 to finely adjust a position of the plunger 20. The knob 34 may also provide a stand or base platform on which the system 10 can rest. In use, the system 10 may be rested on knob 34. In this way, fluid from chambers 56 and 58 may employ gravity when permitted to flow to fill the mixing chamber 28.

The shaft 32 includes a centrally disposed threaded portion 36 with threads 38 of sufficient size to permit an engagement portion 42 of a switch 40 to restrain longitudinal motion of the plunger 20. Other mechanical structures may be employed other than threads 38 including but not limited to a plurality of openings, protrusions, loops, etc. Plunger 20 may be sealed at its entry position into the mixing chamber 28 to inadvertent prevent leakage.

In one embodiment, mixing chamber 28 includes two ports or openings 48, which selectively, fluidly communicate with chambers 56 and 58 of a holder cap 70. It should be understood that the mixing chamber 28 and/or the holder cap 70 may be configured to permit more than two chambers 56 and 58 so as to allow a greater number of components to be concurrently mixed or infused. Holder cap 70 includes internal threads that engage external threads 18 of the body 12. As mentioned, other engagement techniques may be employed instead of or in addition to threaded connections.

At an interface 51 region between the holder cap 70 and the body 12, rotating cap end 50 is provided. The rotating cap end 50 includes holes 84 depicted in FIG. 2, which correspond with positions and number of chambers 56, 58.

Figure 2:
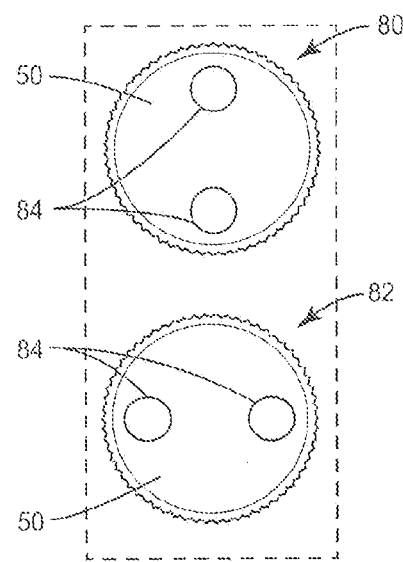
FIG. 2 is a view of a rotating holder end cap showing two configurations corresponding with an open and a closed condition in accordance with the principles of the present disclosure.

Referring to FIG. 2, the rotating cap end 50 includes a disk-shape having holes 84 that rotate with the rotating cap end 50. In a first position 80, the rotating cap end 50 prevents material from moving between channels 54 of the chambers 56 and 58 and the openings 48 in the mixing chamber 28. In a second position 82, the rotating cap end 50 is rotated to move the holes 84 to be in alignment (or partial alignment) with the channels 54 of the chambers 56 and 58 and the openings 48 to permit fluid communication therebetween. The rotating cap end 50 may be included as part of the holder cap 70 or may be connected as part of the body 12.

Figure 3:
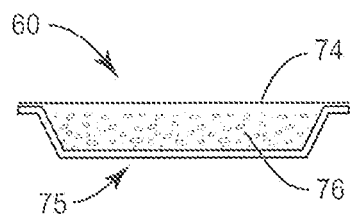
FIG. 3 is a cross-sectional view of a powder tray as an example of one component of bone cement in accordance with the principles of the present disclosure.

The holder cap 70 is configured to receive a first component 60 in the chamber 56 and a second component 62 in the chamber 58. The components 60 and 62 may be in liquid form or may include packets or vials of materials. In one embodiment, as depicted in FIG. 3, component 60 includes a powder tray 75 having a foil or plastic seal 74. The powder tray 75 may be formed from a polyethylene terephtha late glycol (PETG) material although other materials may be employed. The powder tray 75 may include a bone cement component 76, such as a powder 76 or other material employed in forming a bone cement.

In this example, the bone cement may be formed from a powder (e.g., pre-polymerized PMMA and/or PMMA or MMA co-polymer beads and/or amorphous powder, radio-opacifer, initiator) and a liquid (MMA monomer, stabilizer, inhibitor). The two components 60, 62 are mixed and a free radical polymerization occurs of the monomer when the initiator is mixed with the accelerator. The bone cement viscosity changes over time from a runny liquid into a dough-like material that can be applied and then finally hardens into solid hardened material.

Referring again to FIG. 1, component 62 may include a material which when mixed or infused with the component 60 forms bone cement for medical use. In one embodiment, component 62 includes a glass vial (78) including a monomer employed to form bone cement with the powder 76 (FIG. 3). Component 62 may be delivered into chamber 58 as a liquid or in a container, such as the vial or the like. An end cap 72 may be included to close off the chambers 56 and 58 to store the components 60 and 62 therein. In one embodiment, the holder cap 70 is prepared in advance of a procedure by inserting component 60 and component 62 in the chambers 56 and 58, respectively, in the holder cap 70. The loaded holder cap 70 may be shrink-wrapped or otherwise configured or readied for use during a procedure.

During a procedure, the holder cap 70 is loaded (or may be preloaded as described) with components 60 and 62. The holder cap 70 is installed on the body 12 and the channels 54 are aligned with the openings 48. The channel may include ring shapes so that they are always aligned with the opening 48 despite the rotational position of the holder cap 70. The rotating holder cap end 50 is rotated its holes 84 with channels 54 and openings 48 until a last turn of the holder cap 70 during installation. Turning the holder cap 70 onto the threads 18 activates a break device 90 (FIG. 4) to open up the components 60 and 62 to permit flow of their contents into the mixing chamber 28. Continuing to install the holder cap 70, friction on the last turn causes the rotating holder cap end 50 to be misaligned to close off the holder cap 70 to prevent matter from traversing between the chambers 28, 56 and 58.

Figure 4:
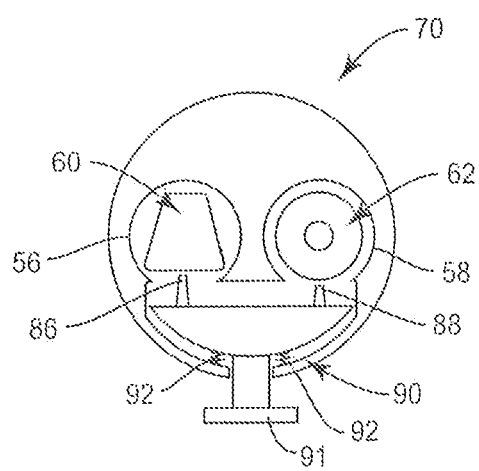
FIG. 4 is a top view of a holder cap showing two components therein and a breaking device configured to concurrently breach containers of the components in accordance with the principles of the present disclosure.

Referring to FIG. 4, a top view of the holder cap 70 is shown with the end cap 72 removed to show components 60 and 62 loaded in chambers 56 and 58. In this embodiment, the components 60 and 62 are provided in containers, component 60 in a powder tray 75 and component 62 in a vial 78. The containers may include scorable or breakable features or seals that when breached by a break/tear device 90 cause their contents to flow or move into the mixing chamber 28. The device 90 may be mounted on a side wall the holder cap 70. The device 90 is biased by, e.g., springs 92 in a direction away from the chambers 56 and 58. The device 90 may include a locking mechanism (not shown) to prevent prematurely puncturing the containers of the components 60 and 62 when preloaded. The device 90 includes appropriate breaking or tearing heads 86 and 88 that correspond to the types of containers deployed in chambers 56 and 58. In the illustrative example shown in FIG. 4, head 86 includes a pointed tool to puncture and/or tear the seal 74 to release the contents, and head 88 includes a hammer tool 88 to punctures or crack the vial 78 to release the contents. The break device 90 may include a seal at points where it enters the chambers 56 and 58 to prevent unwanted leakage.

The break device 90 may be activated by manually advancing the device 90 or a portion 91 of the device may engage a portion of the body 12 when the holder cap 70 is being installed on the body 12. For example, the portion 91 may hit a strike point or other position to advance and hold the break device 90 to permit the contents of the components containers to flow into the mixing chamber without leakage.

Referring again to FIG. 1, the contents of the chambers 56 and 58 flow into the mixing chamber 28 to fill or partially fill the chamber 28. The rotating holder cap end 50 is rotated to close off the openings 48. Trigger 16 is activated (pulled) to actuate the switch 40, which is pivotally connected to the handle 14 or body 12. Pulling the trigger 16 rotates the switch 40 to release the threads 38 by disengaging the engagement portion 42 of the switch 40. The plunger 20 and the piston 24 move into the chamber 28 and increase the pressure therein to cause an infusion of the contents of components 60 and component 62. The piston 24 may optionally be moved back and forth by employing the plunger 20 to further perturb the contents of mixing chamber 28. The plunger 20 and piston 24 are driven by spring 30, which causes a high pressure to be developed in the mixing chamber 28. In some embodiments, the mixing process lasts only a few seconds before the cement is ready to be dispensed.

The piston 24 is moved proximally to prepare for dispensing the cement in the mixing chamber 28. The threads 38 may be employed to assist in drawing the plunger 20 back by engaging the threads 38 with the engagement portion 42 and rotating the knob 34. Where high pressure is developed, the rotating holder end cap 50 remains closed. The holder cap 70 may now be removed and replaced with a dispensing nozzle 100, illustratively depicted in FIGS. 5 and 6.

Figure 5:
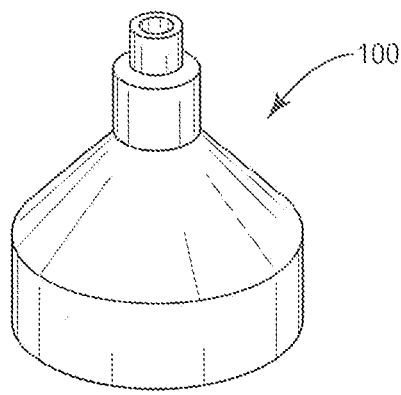
FIG. 5 is a perspective view of a dispensing nozzle of the system shown in FIG. 1.
Figure 6:
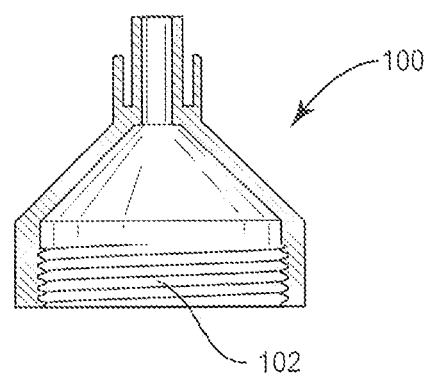
FIG. 6 is a cross-sectional view of the dispensing nozzle shown in FIG. 5 in accordance with the principles of the present disclosure.

Referring to FIGS. 5 and 6, a perspective view of the dispensing nozzle 100 and a cross-sectional view of the dispensing nozzle 100 are respectively and illustratively shown. The dispensing nozzle 100 may include any configuration for dispensing bone cement or other material from the system 10 of FIG. 1. For example, the dispensing nozzle 100 may be employed for dispensing material, or a needle or other device may be attached to the nozzle 100 for dispensing material. Once the holder cap 70 is removed, the dispensing nozzle 100 is equipped with threads 102 or other connection mechanisms to permit the dispensing nozzle 100 to be connected to the body 12 in the same manner as the holder cap 70. Bone cement may now be dispensed from the mixing chamber 28 by activating the trigger 16 to pivot the switch 40 to disengage the threads 38 from the engagement portion 42 as described above. By releasing the threads 38, the spring 30 moves the plunger 20 and the piston 24 distally to dispense the contents of the mixing chamber 28 through the nozzle 100.

In assembly, operation and use, system 10 is employed with a surgical procedure, such as, for a treatment of bone injuries, to provide bone repairs, to strengthen or rebuild bones, etc. It is contemplated that one or all of the components of system 10 can be delivered or implanted as a pre-assembled device or can be assembled in situ. System 10 may be completely or partially revised, removed or replaced.

For example, as shown in FIGS. 1-6, system 10 and accessories thereof, described above, can be employed during a surgical procedure for mixing and dispensing bone cement. In use, a medical practitioner obtains access to a surgical site including a bone in any appropriate manner, such as through incision and retraction of tissues. It is envisioned that system 10 can be used in any existing surgical method or technique including open surgery, mini-open surgery, minimally invasive surgery and percutaneous surgical implantation, whereby the bone is accessed through a mini-incision, or sleeve that provides a protected passageway to the area. Once access to the surgical site is obtained, the particular surgical procedure can be performed for treating or repairing the bone.

An incision is made in the body of a patient and a cutting instrument (not shown) creates a surgical pathway for implantation of components of system 10. A preparation instrument (not shown) can be employed to prepare tissue surfaces of the bone, as well as for aspiration and irrigation of a surgical region according to the requirements of a particular surgical application.

Holes, fractures, voids, depressions, etc. may exist in the bone or may be created in the bone as part of the procedure. After appropriate steps are taken for the treatment or repair, these holes, fractures, voids, depressions, etc. are filled with the mixed bone cement to maintain or improve the bone's structural integrity. Components of system 10, e.g., a needle attached to dispensing nozzle 100 is delivered to the surgical site along the surgical pathway(s) and into or onto bone tissue.

In one embodiment, system 10 may also deliver an agent, which may be mixed in the bone cement (in, e.g., component 60 or 62) or delivered separately. It is envisioned that the agent may include bone growth promoting material.

It is contemplated that the agent may include therapeutic polynucleotides or polypeptides. It is further contemplated that the agent may include biocompatible materials, such as, for example, biocompatible metals and/or rigid polymers, such as, titanium elements, metal powders of titanium or titanium compositions, sterile bone materials, such as allograft or xenograft materials, synthetic bone materials such as coral and calcium compositions, such as HA, calcium phosphate and calcium sulfite, biologically active agents, for example, gradual release compositions such as by blending in a bioresorbable polymer that releases the biologically active agent or agents in an appropriate time dependent fashion as the polymer degrades within the patient. Suitable biologically active agents include, for example, BMP, Growth and Differentiation Factors proteins (GDF) and cytokines. The components of correction system 10 can be made of radiolucent materials such as polymers. Radiomarkers may be included for identification under x-ray, fluoroscopy, CT or other imaging techniques. It is envisioned that the agent may include one or a plurality of therapeutic agents and/or pharmacological agents for release, including sustained release, to treat, for example, pain, inflammation and degeneration.

It is envisioned that the use of microsurgical and image guided technologies may be employed to access, view and repair bone deterioration or damage, with the aid of the system 10. Upon completion of the procedure, the surgical instruments and assemblies are removed and the incision is closed.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A mixer gun system having a removable holder cap configured to separately store two or more components in separate chambers formed therein, the two or more components being selectively releasable through channels fluidly communicating with the separate chambers, the two or more components being constituent materials for a bone cement mixture, a body forming a mixing chamber therein and configured to receive the holder cap, the mixing chamber including at least one opening corresponding with the channels for the separate chambers, a piston disposed within the mixing chamber, and a plunger coupled to the piston and configured to be biased toward the mixing chamber such that when the two or more components are released into the mixing chamber a pressure developed by a biased motion of the plunger and piston infuses the two or more components, the body including a handle, a trigger that is coupled to the handle, and a switch that is pivotally coupled to the body, the plunger including a threaded portion that engages the switch to prevent the biased motion, the trigger being configured to activate the switch to release the plunger to provide the biased motion.

2. The mixer gun system recited in claim 1, further comprising the two or more components, wherein one of the two or more components are stored within one of the chambers, the two or more components including a powder and a liquid that form the bone cement mixture when mixed.

3. The mixer gun system recited in claim 1, wherein the holder cap includes a rotating holder end cap configured to selectively open and close the separate chambers.

4. A mixer gun system comprising:
a holder cap configured to separately store two or more components in separate chambers formed therein, the two or more components being selectively releasable through channels fluidly communicating with the separate chambers, the two or more components being constituent materials for a bone cement;
a body forming a mixing chamber configured to receive the holder cap and to apply pressure to infuse the two or more components into one another,
a high force spring coupled to a plunger, which is coupled to a piston disposed within the mixing chamber, wherein the plunger is biased such that when the two or more components are released into the mixing chamber from the holder cap a pressure developed by a biased motion of the plunger and piston infuses the two or more components to form the bone cement and, upon resetting the plunger and the piston, the bone cement is dispensed from the mixing chamber by the same biased motion,
wherein the body includes a handle and a trigger that is pivotally coupled to the handle for releasing the plunger for the biased motion and a switch is pivotally coupled to the body, the plunger including a threaded portion that engages the switch to prevent the biased motion of the plunger, the trigger being configured to activate the switch to release the plunger to provide the biased motion.

5. The mixer gun system recited in claim 4, wherein the holder cap includes a threaded connection with the body.

6. The mixer gun system recited in claim 5, wherein the threaded connection of the body is configured to receive a dispensing nozzle to replace the holder cap.

7. The mixer gun system recited in claim 4, wherein the holder cap comprises two separate chambers where one chamber is configured to receive a first component of the two or more components and a second chamber is configured to receive a second component of the two or more components.

8. The mixer gun system recited in claim 7, wherein the first component includes a powder disposed in a tray.

9. The mixer gun system recited in claim 7, wherein the second component includes a monomer disposed in a vial.

10. The mixer gun system recited in claim 7, wherein the holder cap includes a break device configured to concurrently release the first component and the second component from the separate chambers.

11. The mixer gun system recited in claim 10, wherein the break device is activated to concurrently release the first component and the second component upon attachment of the holder cap to the body.

12. The mixer gun system recited in claim 4, wherein the holder cap includes a rotating end cap configured to provide fluid communication between the separate chambers and the mixing chamber in a first position and prevent fluid communication between the separate chambers and the mixing chamber is a second position.

13. The mixer gun system recited in claim 4, wherein the switch includes an engagement portion for engaging threads of the threaded portion formed in a shaft of the plunger.

14. The mixer gun system recited in claim 13, wherein the plunger is retracted by turning the threads against the engagement portion.

15. A method for delivering bone cement, the method comprising the steps of:
  providing the mixer gun system recited in claim 4;
  infusing the two or more components by releasing the two or more components into the mixing chamber from the separate chambers and a developing pressure by the biased motion to form the bone cement;
  resetting the plunger and the piston to prepare for dispensing the bone cement; and
  dispensing the bone cement from the mixing chamber by the same biased motion.

* * * * *

UNITED STATES PATENT AND TRADEMARK OFFICE
CERTIFICATE OF CORRECTION

| | |
|---|---|
| PATENT NO. | : 9,839,889 B2 |
| APPLICATION NO. | : 15/159177 |
| DATED | : December 12, 2017 |
| INVENTOR(S) | : Quinto |

Page 1 of 1

It is certified that error appears in the above-identified patent and that said Letters Patent is hereby corrected as shown below:

In the Specification

In Column 1, Line 7, delete "2012," and insert -- 2012, now Pat. No. 9,358,715, --, therefor.

In Column 2, Lines 48-49, delete "two or components" and insert -- two or more components --, therefor.

In Column 5, Line 62, delete "mixing chamber 12." and insert -- mixing chamber 28. --, therefor.

In the Claims

In Column 10, in Claim 4, Line 33, delete "another," and insert -- another; --, therefor.

Signed and Sealed this
Fifth Day of June, 2018

Andrei Iancu
*Director of the United States Patent and Trademark Office*